UNITED STATES PATENT OFFICE.

LOUIS E. FULLER, OF NEW YORK, N. Y., ASSIGNOR TO A. B. DICK COMPANY, OF CHICAGO, ILLINOIS, A CORPORATION OF ILLINOIS.

STENCIL-SHEET.

1,244,188.  Specification of Letters Patent.  Patented Oct. 23, 1917.

No Drawing.  Application filed February 12, 1916.  Serial No. 78,043.

*To all whom it may concern:*

Be it known that I, LOUIS E. FULLER, a citizen of the United States, residing in the borough of Manhattan, city, county, and State of New York, have invented certain new and useful Improvements in Stencil-Sheets, of which the following is a specification.

My invention relates to stencil-sheets suitable for use, for example, in addressing- or duplicating-machines, for the production of multiple copies of written or typewritten matter, diagrams, etc. Heretofore such stencil-sheets have been made largely of coagulated protein, and these, before being stencilized, have been moistened to soften or otherwise affect the coated surface, to thereby facilitate the stencilizing operation. The object of the present invention is to produce a stencil-sheet which shall be normally impervious to ink, which may be stencilized without preliminary moistening, and which shall be usable throughout an extended period of time after its preparation.

In carrying out the invention in a preferred form, I employ a solution having as its base a colloidal substance, for example glue or gelatin of substantial jelly strength, such as the hide glue now commonly known as "No. 1." With this I combine, in suitable proportions as hereinafter indicated, water, alizarin oil, a suitable fat acid, such, for instance, as pure oleic acid, a solvent such as denatured alcohol and a suitable hardening or coagulating medium, such, for example, as formaldehyde. In this composition the oleic acid and alizarin oil are severally and jointly effective in resisting the tendency of the coating or impregnating composition to dry and become hard and brittle so that they each serve to keep the coating usable without moistening for an extended period. By the term "fat acids" I refer to the acids most frequently met with in fat, such as oleic, palmitic and stearic. This solution, prepared as hereinafter set forth more in detail, is employed as a bath, in which may be immersed sheets of a suitable basic material, such, for example, as open porous fiber of the character of the paper commonly known as "Yoshino," after such immersion the solution being allowed to dry and harden. Thereafter, and for a substantial period of time following its preparation, the stencil-sheets so formed may be stencilized in the usual manner, i. e., by placing them in a typewriting-machine and impressing the type characters thereon by pressure. A stencil-sheet so formed may be used for the production of multiple copies in any of the well-known duplicating-machines.

As an embodiment of my invention is a preferred form but without limiting myself thereto, I shall describe the ingredients used and the steps taken in the preparation of the solution wherewith the basic sheet is treated.

I first, as above stated, select a glue or gelatin of substantial jelly strength (such, for example, as No. 1 hide glue), and for ease of manipulation grind the same to reasonably small particles. To about ten grams of this ground glue, I add about forty grams of water, agitating the mixture thereafter to thoroughly wet said particles. I then add to such mixture about forty grams of alizarin oil or Turkey-red oil, this being the material commercially on the market and so known as "50% commercial Turkey-red oil." (If this be found to contain substantially less than fifty per cent. fat, the proportion of the whole should be slightly increased, as, for example, to forty-five or fifty grams.) I then add to the mixture about thirty grams of pure oleic acid, and a solvent such as denatured alcohol to the extent of about fifty grams. The mixture should then be allowed to stand until the particles of glue shall have been swollen, or to save time may be agitated for about twenty minutes. It should then be warmed in a water-bath until the particles of glue shall have become melted and the compound has become substantially homogeneous.

I next add to the solution a material which will, to some extent, harden the solution after it shall have been placed upon the Yoshino sheet, and also preferably act as a preservative of the fats and oils in such solution. A suitable material for this purpose is ordinary commercial formaldehyde, and of this I add, in the solution as above compounded, about five grams.

At this point, it should be remarked that the solution should, of course, be free from all impurities and even from bubbles or foam, the latter being either allowed to evaporate or being disposed of by the addition to the solution of a few drops of ether.

After this shall have been done, the solution is ready for application to the basic fabric of which the sheet is composed.

The operation of applying the solution to the Yoshino sheet is at the present time well understood. A solution such as that above described as a preferred form of my invention may be placed in a suitable shallow pan, provided with a rod or other device adapted to remove surplus solution from the surface of the Yoshino sheet. Such sheet may be allowed to rest upon the surface of the solution and then drawn over such surface, past the rod or other similar device, thereby removing surplus solution, and then exposed to the air, whereupon the solution will, within a comparatively short time, harden and dry, so that the sheet may thereafter be freely manipulated without the danger of cracking or injuring the same, thereby opening interstices which would detract from the usefulness of the sheet as a stencil.

Also, such a sheet may be stencilized in the well-known manner, such, for example, as by passing it into a writing-machine in combination with a backing, preferably of firm hard-surfaced paper, the ribbon of the machine being removed and the type impinging directly upon the surface of the stencil-sheet. If desirable for the purpose of obtaining broader lines in the type characters, a sheet of bolting-cloth may be inserted between the stencil-sheet and the backing. After stencilization in the manner suggested, the sheet may be used for the production of multiple copies in any suitable duplicator.

What I claim is:—

1. A stencil blank comprising a sheet of open porous material impregnated with a colloidal substance containing a fat acid, substantially as set forth.

2. A stencil blank comprising a sheet of open porous material impregnated with a coagulated colloidal substance containing a fat acid distributed substantially homogeneously therethrough, substantially as set forth.

3. A stencil blank comprising a sheet of open porous material impregnated with coagulated protein containing a fat acid distributed therethrough, substantially as set forth.

4. A stencil blank comprising a sheet of open porous material treated with a substance including a colloid, a fat acid and formaldehyde, substantially as set forth.

5. A stencil blank comprising a sheet of open porous material impregnated with a colloidal substance containing a fat acid and alizarin oil distributed therethrough, substantially as set forth.

6. A stencil blank comprising a sheet of open porous material impregnated with a composition comprising coagulated protein, a fat acid and alizarin oil, substantially as set forth.

7. A stencil blank comprising a sheet of open porous material impregnated with a composition comprising a coagulated colloidal substance, oleic acid and alizarin oil, substantially as set forth.

8. A stencil blank comprising a sheet of open porous material treated with a mixture including a colloidal substance, formaldehyde, a fat acid and alizarin oil, substantially as set forth.

9. A stencil blank comprising a sheet of open porous material impregnated with a composition comprising coagulated protein and oleic acid, substantially as set forth.

10. A stencil blank comprising a sheet of open porous material impregnated with a composition comprising coagulated glue and oleic acid, substantially as set forth.

11. A stencil blank comprising a sheet of open porous material impregnated with a coagulated colloidal substance containing oleic acid distributed substantially homogeneously therethrough, substantially as set forth.

12. A stencil blank comprising a sheet of open porous material impregnated with a coagulated colloidal substance containing oleic acid and alizarin oil distributed therethrough, substantially as set forth.

This specification signed and witnessed this 24th day of December, 1915.

LOUIS E. FULLER.

Witnesses:
S. O. EDMONDS,
I. McINTOSH.